US006208601B1

(12) United States Patent
Shimizu et al.

(10) Patent No.: US 6,208,601 B1
(45) Date of Patent: Mar. 27, 2001

(54) OPTICAL INFORMATION RECORDING METHOD AND APPARATUS

(75) Inventors: Atsuo Shimizu; Akira Negishi; Ryuichi Sunagawa, all of Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/481,690

(22) Filed: Jan. 12, 2000

(30) Foreign Application Priority Data

Jan. 13, 1999 (JP) .................................................. 11-006796

(51) Int. Cl.$^7$ ........................................................ G11B 7/00
(52) U.S. Cl. .............................................. 369/54; 369/116
(58) Field of Search ................................. 369/54, 58, 47, 369/48, 49, 50, 59, 116, 44.28, 44.32, 275.1, 275.4, 112, 109

(56) References Cited

U.S. PATENT DOCUMENTS

| | | | |
|---|---|---|---|
| 4,710,908 | * 12/1987 | Oshima et al. | 369/116 X |
| 4,823,335 | * 4/1989 | Shikama et al. | 369/112 |
| 4,896,313 | * 1/1990 | Hirose et al. | 369/109 X |
| 5,105,411 | * 4/1992 | Ishika | 369/112 X |

FOREIGN PATENT DOCUMENTS 08147701  6/1996  (JP) .

OTHER PUBLICATIONS

Abstract of Japanese Patent Publication No. 08147701 dated Jun. 7, 1996.

* cited by examiner

*Primary Examiner*—Muhammad Edun
(74) *Attorney, Agent, or Firm*—Lowe Hauptman Gopstein Gilman & Berner

(57) ABSTRACT

An inclination, at a pit forming position, of the information recording surface of an optical disc with respect to a plane that is perpendicular to laser light emitted from an optical pickup is detected by a tilt sensor. Pits are formed while the laser light intensity is increased as the detected inclination increases. The illumination light quantity per unit area decreases as the inclination of the information recording surface increases. Setting the laser light intensity at a larger value as the inclination of the information recording surface increases makes it possible to compensate for reduction of the illumination light quantity per unit area that occurs in association with inclination of the information recording surface without the need for correcting the laser light emitting direction. Therefore, even if the information recording surface of an optical information recording medium is inclined, information recording can be performed with a constant laser light emitting direction.

8 Claims, 4 Drawing Sheets

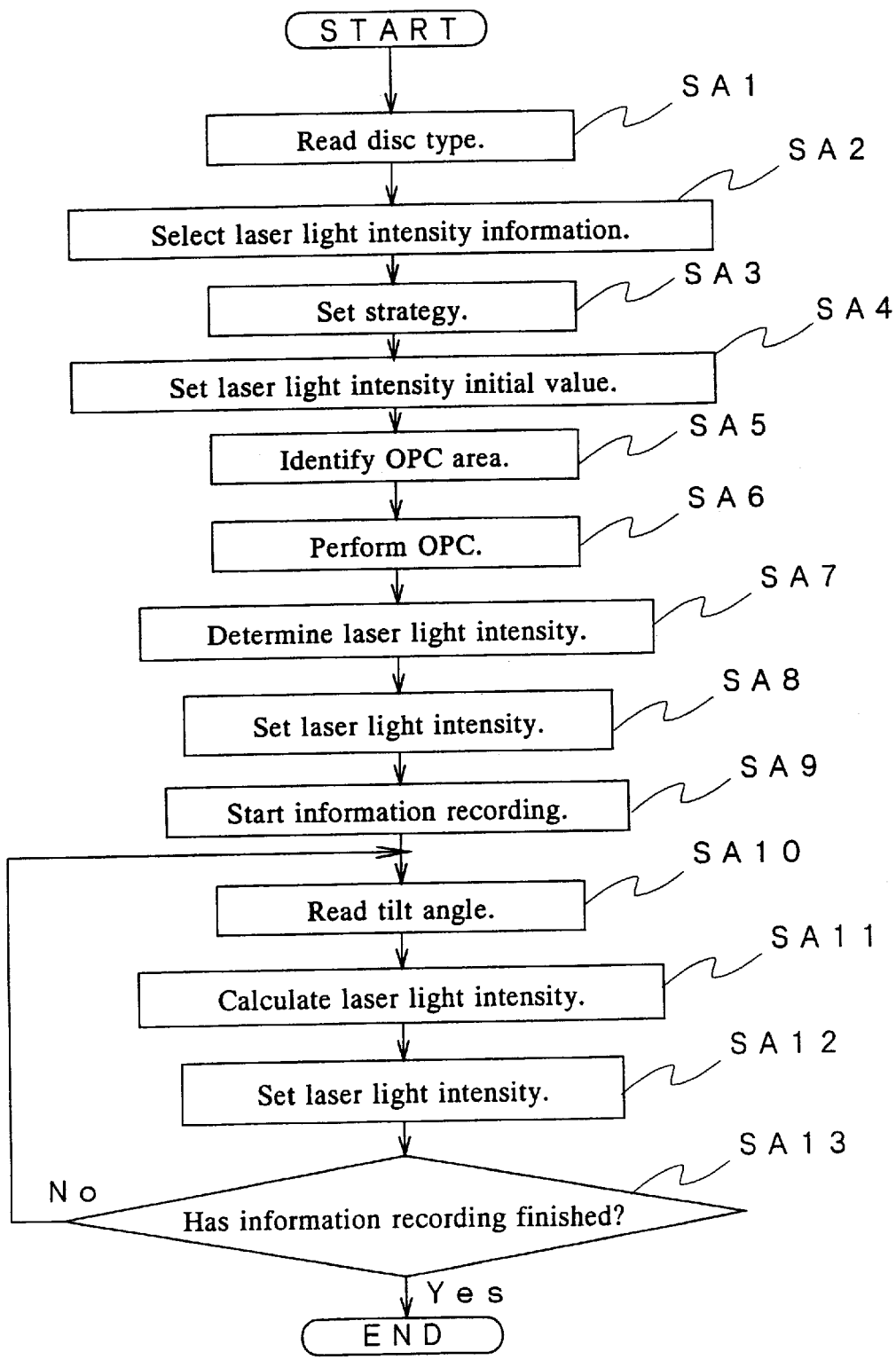

OPTICAL INFORMATION RECORDING METHOD AND APPARATUS

BACKGROUND OF THE INVENTION

1. Field of the Invention

The present invention relates to an optical information recording method and apparatus which can reduce the degree of quality deterioration of recorded information due to inclination of the information recording surface of an information recording medium.

2. Description of the Related Art

Conventionally, the capacity and the recording speed have increased in the technology for recording information on an optical information recording medium. In recent years, techniques of recording information at high speeds have become commonplace. For example, recording speeds of two to six times the basic speed or even higher speeds are used.

Write-once optical discs (CD-R) are commonly used as optical information recording media.

In recording information on an optical disc, a digital signal is generated by digitizing recording subject information. Pits are formed on the optical disc by applying pulse laser light from an optical pickup to the rotating optical disc based on the digital signal.

In forming pits on the optical disc by using a digital signal generated by digitizing recording subject information, the intensity of laser light that is applied from the optical pickup to the optical disc is increased during periods when, for example, the digital signal is at a high level. As a result, the recording layer of the optical disc is changed by the laser light energy and pits are formed. On the other hand, during periods when the level of the digital signal is low, low-intensity laser light that is necessary for tracking control is applied from the optical pickup to the optical disc.

The information recording surface of an optical disc may incline due to a warp or deformation of the disc. As shown in FIG. 2, in most cases inclination of the information recording surface is not uniform and gradually increases as the position on an optical disc 1 goes outward. The inclination angle θ of the information recording surface with respect to a plane 3 that is perpendicular to the rotation axis 2 of the optical disc 1 is generally called a tilt angle.

Where the information recording surface has no inclination, as shown in FIG. 3, laser light 5 that is emitted from an optical pickup 4 is applied approximately vertically to the information recording surface. Pits are formed by the laser light 5.

However, where the emitting direction of laser light 5 is constant and the information recording surface has inclination, the spot of the laser light 5 that is formed on the information recording surface is distorted in shape. Therefore, the illumination light quantity per unit area on the information recording surface decreases and the pit size decreases. As a result, jittering during information reproduction becomes worse.

To solve the above problem, as shown in FIG. 4, the emitting direction of laser light 5 is varied so as to be kept vertical to the information recording surface of an optical disc 1. This is done in such a manner that an inclination (tilt angle) of the information recording surface of the optical disc 1 is detected and the optical pickup 4 is inclined based on the detected tilt angle.

However, the mechanism of inclining the optical pickup 4 in accordance with the tilt angle θ is complex, which increases the cost of the apparatus.

There is a method for performing appropriate recording (appropriateness: β) without using a tilt angle correction mechanism. That is, Japanese Patent Laid-Open No. 8-147701 entitled "Power Calibration Method of an Optical Disc Recording/Reproducing Apparatus" discloses a method for optimizing the recording laser light intensity even at an outer area (OPC: optimum power control). However, this method has a problem that the OPC takes long time. The above parameter β, which represents asymmetry, is given by $\beta=(A_1+A_2)/(A_1-A_2)$ in the case of CD-R, where $A_1$ and $A_2$ are a top-level value and a bottom-level value, respectively, of pulses of 11T.

SUMMARY OF THE INVENTION

An object of the present invention is to provide an optical information recording method and apparatus which can record information with a constant laser light emitting direction even if the information recording surface of an optical information recording medium is inclined.

In the following manner, the invention makes it possible to perform information recording with a constant laser light emitting direction even if the information recording surface is inclined.

That is, pits are formed while the intensity of laser light is set higher as the acute angle that is formed by the information recording surface and the optical axis of the laser light at a pit forming position decreases.

First, an imaginary plane that is perpendicular to the laser light that is applied from an optical pickup to an optical information recording medium is assumed. Next, an inclination, at the pit forming position, of the information recording surface of the optical information recording medium with respect to the imaginary plane is detected. The laser light intensity is set higher as the detected inclination increases, and pits are formed by using the thus-set laser light intensity.

In this optical information recording method, pits are formed while the laser light intensity is set higher as the inclination, at a pit forming position, of the information recording surface of the optical information recording medium increases.

As the inclination of the information recording surface increases, the illumination light quantity per unit area decreases because of distortion of the laser light spot. However, since the laser light intensity is set higher as the detected inclination increases, reduction of the illumination light quantity per unit area that is associated with inclination of the information recording surface can be compensated for. Therefore, it is not necessary to correct the laser light emitting direction.

This optical information recording method makes it possible to form pits having necessary shapes at proper positions even if the information recording surface of an optical information recording medium has inclination, and hence to perform information recording that is superior in information reproduction characteristics.

In the invention, in the above information recording method, a corresponding relationship between the inclination of the information recording surface of an optical information recording medium and the laser light intensity is prepared in advance as intensity setting information and laser light intensity is set based on the intensity setting information during information recording.

By preparing in advance, as the intensity setting information, the corresponding relationship between the inclination of the information recording surface of an optical information recording medium and the laser light intensity, the time required for setting of laser light intensity during actual information recording can be shortened.

Further, in the invention, pieces of intensity setting information are prepared for respective types of optical information recording media. During actual information recording, laser light intensity is set by using intensity setting information corresponding to the type of an optical information recording medium as a subject of information recording.

By determining, in advance, pieces of intensity setting information for respective types of optical information recording media, laser light intensity corresponding to the type of an optical information recording medium can be set in a short time.

According to another aspect of the invention, the above-described method is applied to an optical information recording apparatus for forming pits by applying pulse laser light to an optical information recording medium, based on a digital signal corresponding to recording subject information, from laser light emitting means that moves relatively to the optical information recording medium.

That is, the optical information recording apparatus according to the invention comprises inclination detecting means and laser light intensity setting means.

The inclination detecting means automatically detects an inclination, at a pit forming position, of the information recording surface of the optical information recording medium with respect to a plane that is perpendicular to the laser light.

The laser light intensity setting means automatically sets the intensity of the laser light emitted from the laser light emitting means at a larger value as the inclination of the information recording surface that is detected by the inclination detecting means increases.

In this optical information recording apparatus, the inclination detecting means detects an inclination of the information recording surface. The laser light intensity setting means sets the intensity of the laser light emitted from the laser light emitting means at a larger value as the detected inclination increases.

Therefore, pits are formed while the laser light intensity is automatically set higher as the inclination of the information recording surface at a pit forming position increases.

As the inclination of the information recording surface increases, the shape of the laser light spot is more distorted and hence the illumination light quantity per unit area decreases. However, in the apparatus according to the invention, since the laser light intensity is automatically set higher as the inclination of the information recording surface increases, reduction of the illumination light quantity per unit area that is associated with inclination of the information recording surface can be compensated for. Therefore, it is not necessary to correct the laser light emitting direction.

Further, the invention provides an optical information recording apparatus in which the laser light intensity setting means comprises information storing means, intensity selecting means, and intensity setting means.

The information storing means stores intensity setting information that correlates the inclination of the information recording surface of an optical information recording medium and the laser light intensity.

The intensity selecting means automatically selects laser light intensity corresponding to the inclination of the information recording surface during information recording based on the intensity setting information.

The intensity setting means automatically sets the laser light intensity that is selected by the intensity selecting means in the laser light emitting means.

Therefore, in the optical information recording apparatus, laser light intensity corresponding to an inclination of the information recording surface during information recording is selected and set based on the intensity setting information that is stored in the information storing means in advance. This makes it possible to shorten the setting time of the laser light intensity that is performed in actual information in recording.

Further, in the invention, there are provided information storing means for storing pieces of intensity setting information corresponding to respective types of optical information recording media as well as information selecting means for automatically selecting intensity setting information corresponding to the type of an optical information recording medium as a subject of information recording.

This makes it possible to set laser light intensity corresponding to the type of an optical information recording medium as a subject of information recording in a short time.

BRIEF DESCRIPTION OF THE DRAWINGS

FIG. 5 is a flowchart showing the operation of the optical information recording apparatus according to the embodiment of the invention.

DESCRIPTION OF THE PREFERRED EMBODIMENTS

The present invention will be hereinafter described in more detail with reference to the accompanying drawings.

Figure 1:
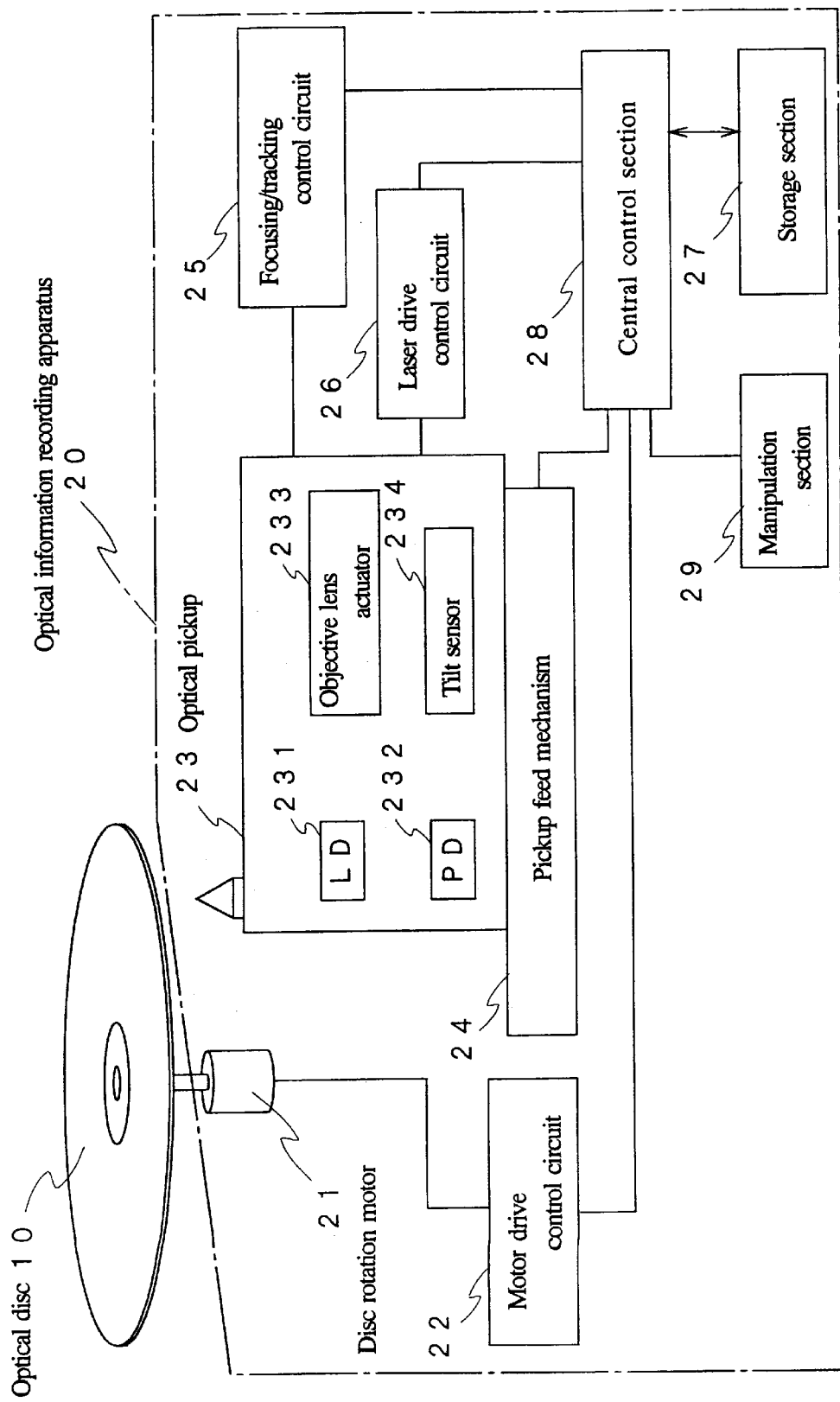
FIG. 1 is a block diagram showing a circuit of an electric system of an optical information recording apparatus according to an embodiment of the invention.
Figure 2:
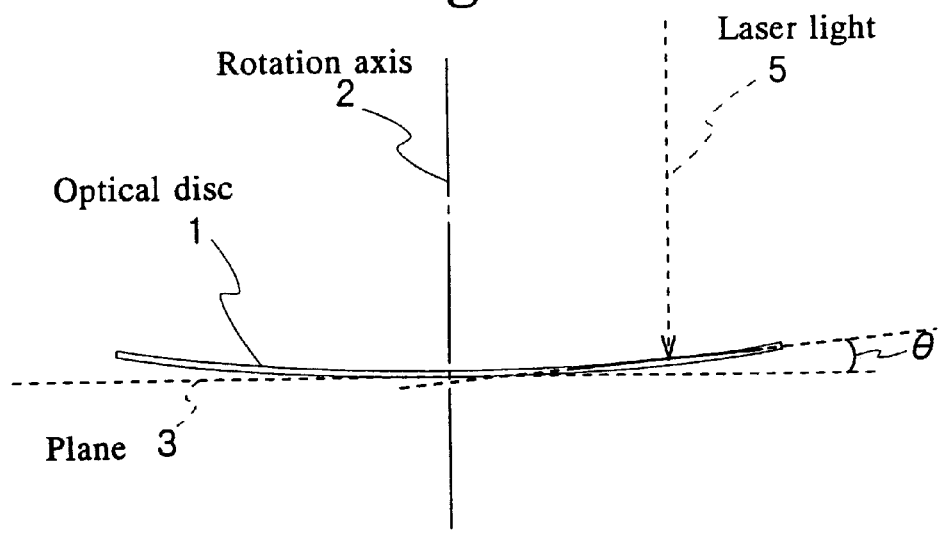
FIG. 2 shows an inclination of an information recording surface.
Figure 3:
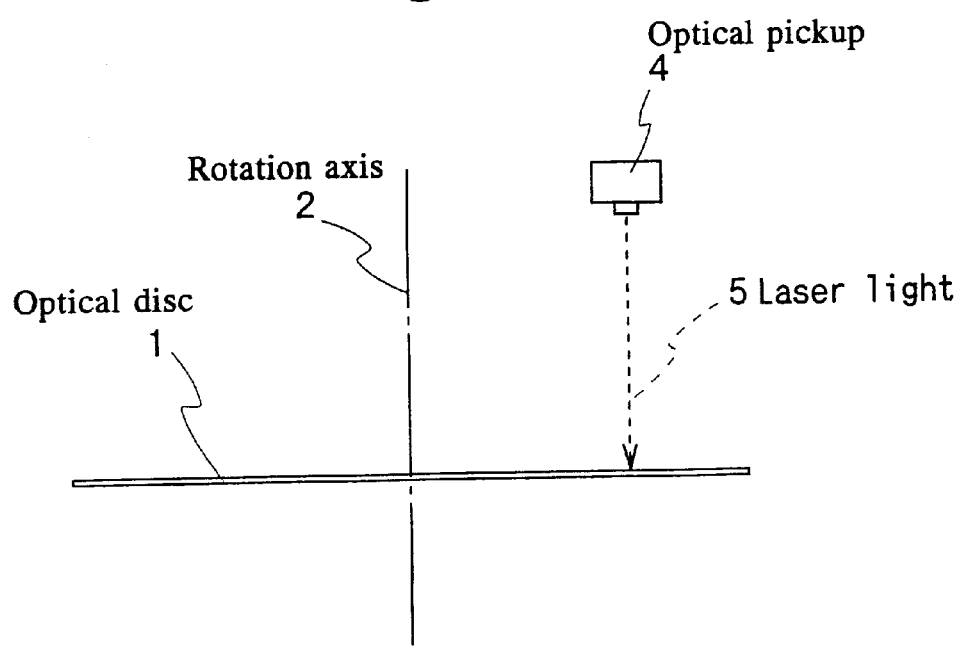
FIG. 3 shows another conventional optical information recording method.
Figure 4:
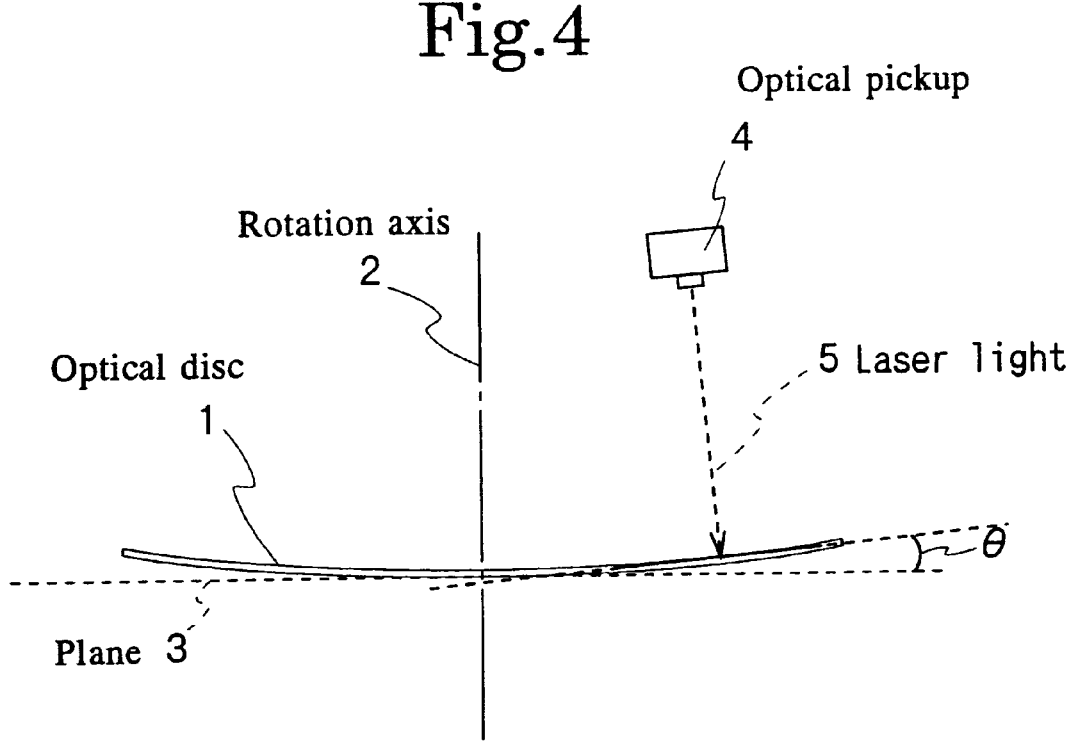
FIG. 4 shows still another conventional optical information recording method.

FIG. 1 is a block diagram of a circuit of an electric system of an optical information recording apparatus according to an embodiment of the invention. In FIG. 1, reference numeral 10 denotes a write-once optical disc such as CD-R or DVD-R and numeral 20 denotes the optical information recording apparatus.

The optical information recording apparatus 20 consists of a disc rotation motor 21, a motor drive control circuit 22, an optical pickup 23, a pickup feed mechanism 24, a focusing/tracking control circuit 25, a laser drive control circuit 26, a storage section 27, a central control section whose main component is a CPU, and a manipulation section 29.

The recording area of the optical disc 10 is formed in advance with a spiral track that is wobbled (snaked) with a very small amplitude. A disc rotation control signal can be extracted from the wobbling of the track.

The disc rotation motor 21 is rotationally driven at a prescribed rotation speed by a drive voltage that is supplied from the motor drive control circuit 22.

The motor drive control circuit 22 supplies the drive voltage to the disc rotation motor 21 based on an instruction signal that is input from the central control section 28.

The optical pickup 23 is equipped with a laser diode (LD) 231, a known four-sectioned photodetector (PD) 232, an objective lens actuator 233, and a tilt sensor 234. The optical pickup 23 is made movable in the radial direction of the optical disc 10 by the pickup feed mechanism 24 of a known linear motor type, for example.

The focusing/tracking control circuit 25 controls the operations of the objective lens actuator 233 and the pickup feed mechanism 24 based on output signals of the photodetector 232 and an instruction supplied from the central control section 28.

The laser drive control circuit 26 receives a digital signal corresponding to recording subject information, and generates write pulses from the digital signal based on strategy setting information that is specified by the central control section 28.

Further, in synchronism with the write pulses, the laser drive control circuit 26 supplies the laser diode 231 with a drive current whose magnitude corresponds to laser light intensity that is set by the central control section 28. The laser diode 231 thus emits laser light whose intensity is specified by the central control section 28.

The storage section 27 is composed of a recording medium such as a semiconductor memory element, a magnetic disk, or an optical disc, a control circuit therefor, and other components. In this embodiment, laser light intensity information that was determined in advance through an experiment, for example, is stored in the storage section 27.

Pieces of laser light intensity information are set for different types of optical discs, respectively. Each piece of laser light intensity information includes, for each speed (e.g., linear velocity) of recording information on an optical disc, strategy setting information, a laser light intensity initial value, a target $\beta$ value of OPC, and a laser light intensity correction rate with respect to the tilt angle. The laser light intensity correction rate is a rate of increasing, with increase of the tilt angle, laser light intensity that is determined by recording laser light intensity optimization (OPC: optimum power control; hereinafter referred to as OPC) that is performed in a disc inner area where the tilt angle is small.

The central control section 28 selects laser light intensity information corresponding to an optical disc type and a recording speed that are input by an operator through the manipulation section 29, and sets strategy setting information for write pulses in the laser drive control circuit 26 based on the selected laser light intensity information. Further, the central control section 28 receives a tilt angle that is detected by the tile sensor 234 each time it is detected during information recording, calculates laser light intensity corresponding to the detected tile angle, and sets the calculated value in the laser drive control circuit 26.

Next, the operation of the optical information recording apparatus 20 having the above configuration will be described in detail with reference to a flowchart of FIG. 5.

When recording subject information has been set and starting of recording has been ordered by an operator, at step SA1 the central control section 28 reads an optical disc type that is input from the manipulation section 29. At step SA2, the central control section 28 selects laser light intensity information corresponding to the optical disc type from the information stored in the storage section 27.

At step SA3, the central control section 28 sets, in the laser drive control circuit 26, strategy setting information that is included in the selected laser light intensity information.

At step SA4, the central control section 28 sets, in the laser drive control circuit 26, a laser light intensity initial value that is included in the selected laser light intensity information.

The laser light intensity information includes, for each of a plurality of linear velocities, strategy setting information, a laser light intensity initial value, and $\beta$. Therefore, the central control section 28 selects and sets strategy setting information and laser light intensity initial value corresponding to a linear velocity that is used for the information recording concerned. As a result, a strategy suitable for the type of the optical disc 10 is set in the laser drive control circuit 26.

Then, the central control section 28 identifies an OPC area on the optical disc 10 to be used for OPC at step SA5 and performs OPC at step SA6.

The OPC is performed by recording prescribed information in the power calibration area (PCA; hereinafter referred to as PCA) of the optical disc 10 and reproducing the recorded information.

The PCA is divided into a test area and a count area each of which is divided into 100 partitions. One partition of the test area consists of 15 frames. One partition of the test area is used for one test writing operation.

In this embodiment, as described in Orange Book that is the book of standard of the write-once optical disc, test writing operations are performed at 15 laser power levels in 15 frames. A laser power value that would attain a target $\beta$ value is selected or calculated in the course of those operations, and subsequent information recording is performed by using the laser power thus determined.

At step SA7, the central control section 28 determines laser light intensity based on results of the OPC. At step SA8, the central control section 28 stores the determined laser light intensity in the storage section 27 as an initial determined value of laser light intensity, and sets it in the laser drive control circuit 26.

At step SA9, the central control section 28 starts information recording. At step SA10, the central control section 28 reads a tilt angle from the tilt sensor 234.

At step SA11, the central control section 28 calculates laser light intensity corresponding to the read-out tilt angle by using a laser light intensity correction rate corresponding to the tilt angle that is included in the above-mentioned laser light intensity information.

At step SA12, the central control section 28 sets the calculated laser light intensity value in the laser drive control circuit 26. In this manner, when the tilt angle varies, information recording is performed, that is, pits are formed, while the laser light intensity is automatically corrected.

At step SA13, the central control section 28 judges whether the information recording has finished. If the information recording has not finished yet, the process returns to step SA10 to continue the information recording.

In the above-described optical information recording apparatus and method, pits are formed while the laser light intensity is varied in accordance with the inclination (tilt angle) of the information recording surface of the optical disc 10.

Therefore, reduction of the illumination light quantity per unit area that occurs in association with inclination of the information recording surface of the optical disc 10 is automatically compensated for. Even if the optical disc 10 is inclined, it is not necessary to correct the laser light emitting direction.

Since pits having necessary shapes can be formed at proper positions, information recording that is superior in information reproduction characteristics can be performed.

Further, in contrast to the conventional case, it is not necessary to provide a complex mechanism for inclining the optical pickup 23 in accordance with the tilt angle to make the laser light emitting direction vertical to the information recording surface of the optical disc 10.

Therefore, the cost of the apparatus can be made lower than in the conventional case.

In this embodiment, a corresponding relationship between the inclination of the information recording surface of the optical disc 10 and the laser light intensity is stored in advance in the storage section 27 as the laser light intensity information (intensity setting information), and in actual information recording laser light intensity is calculated based on this information. Therefore, the time required for setting of laser light intensity that is performed during actual information recording can be shortened.

Further, in this embodiment, pieces of laser light intensity information (intensity setting information) for respective types of optical discs 10 are determined in advance and stored in the storage section 27, and in actual information recording laser light intensity is calculated based on those pieces of information. Therefore, laser light intensity corresponding to the type of the optical disc 10 as a subject of information recording can be set in a short time.

The above-described embodiment is just an example of the invention and the invention is not limited to it.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical information recording method for performing information recording by forming pits on an optical information recording medium by applying laser light to an information recording surface of the optical information recording medium, comprising the step of:
    forming pits while setting intensity of the laser light at a larger value as an angle that is formed by the information recording surface and an optical axis of the laser light at a pit forming position decreases.

2. The optical information recording method according to claim 1, wherein the forming step comprises the steps of:
    detecting an inclination, at the pit forming position, of the information recording surface with respect to a plane that is perpendicular to the laser light; and
    setting the intensity of the laser light at a larger value in forming pits as the detected inclination increases.

3. The optical information recording method according to claim 2, wherein the setting step comprises the steps of:
    preparing in advance, as intensity setting information, a corresponding relationship between an inclination of the information recording surface and laser light intensity suitable for the inclination; and
    setting the intensity of the laser light during information recording by using the intensity setting information.

4. The optical information recording method according to claim 2, wherein the setting step comprises the steps of:
    preparing in advance, as pieces of intensity setting information for respective types of optical information recording media, corresponding relationships between an inclination of the information recording surface and laser light intensity suitable for the inclination; and
    setting the intensity of the laser light during information recording by using one of the pieces of intensity setting information that corresponds to a type of the optical information recording medium as a subject of information recording.

5. An optical information recording apparatus for performing information recording by forming pits on an optical information recording medium by applying, based on a digital signal corresponding to recording subject information, pulse laser light to an information recording surface of the optical information recording medium from laser light emitting means that moves relatively to the optical information recording medium, comprising:
    automatic setting means for automatically setting intensity of the laser light at a larger value as an angle that is formed by the information recording surface and an optical axis of the laser light at a pit forming position decreases.

6. The optical information recording apparatus according to claim 5, wherein the automatic setting means comprises:
    inclination detecting means for automatically detecting an inclination, at the pit forming position of the information recording surface with respect to a plane that is perpendicular to the laser light; and
    laser light intensity setting means for setting the intensity of the laser light that is emitted from the laser light emitting means at a larger value as the detected inclination increases.

7. The optical information recording apparatus according to claim 6, wherein the laser light intensity setting means comprises:
    information storing means for storing intensity setting information that correlates the detected inclination with laser light intensity,
    intensity selecting means for automatically selecting laser light intensity corresponding to the detected inclination by referring to the intensity setting information; and
    intensity setting means for setting the laser light intensity selected in the laser light emitting means.

8. The optical information recording apparatus according to claim 6, wherein the laser light intensity setting means comprises:
    information storing means for storing pieces of intensity setting information for respective types of optical information recording media each of which correlates an inclination of the information recording surface with laser light intensity;
    information selecting means for selecting intensity setting information corresponding to a type of the optical information recording medium as a subject of information recording from among the pieces of intensity setting information stored in the information storing means;
    intensity selecting means for automatically selecting laser light intensity corresponding to the inclination of the information recording surface by referring to the intensity setting information selected; and
    intensity setting means for automatically setting the laser light intensity selected in the laser light emitting means.

* * * * *